US009516072B2

(12) United States Patent
Gärdenfors et al.

(10) Patent No.: US 9,516,072 B2
(45) Date of Patent: Dec. 6, 2016

(54) DEVICE, SYSTEM AND METHOD FOR GENERATING APPLICATION DATA

(71) Applicant: BlackBerry Limited, Waterloo (CA)

(72) Inventors: Dan Zacharias Gärdenfors, Malmö (SE); Svante Magnus Ulfstand Hallerström, Malmö (SE); Mathias Lewin, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 363 days.

(21) Appl. No.: 13/774,586

(22) Filed: Feb. 22, 2013

(65) Prior Publication Data

US 2014/0244739 A1    Aug. 28, 2014

(51) Int. Cl.
| | | |
|---|---|---|
| *G06F 15/16* | (2006.01) | |
| *H04L 29/06* | (2006.01) | |
| *H04M 1/725* | (2006.01) | |
| *G06F 3/14* | (2006.01) | |

(52) U.S. Cl.
CPC ........... *H04L 65/403* (2013.01); *G06F 3/1423* (2013.01); *H04L 67/38* (2013.01); *H04M 1/7253* (2013.01); *G06F 3/1454* (2013.01)

(58) Field of Classification Search
CPC ..................... G06Q 20/3552; G06Q 20/35765; G06Q 20/3227; G06Q 20/3574; G06Q 20/3278; G06Q 20/352; G06Q 20/3563; G06Q 20/3576; G06Q 20/3823; G06Q 10/025; G06Q 20/027; G06Q 20/3672; G06Q 20/02; G06Q 20/36; G06F 3/14; H04L 65/403; H04L 67/38; H04M 1/7253

USPC .......................................................... 709/204
See application file for complete search history.

(56) References Cited

U.S. PATENT DOCUMENTS

| | | | | |
|---|---|---|---|---|
| 8,171,137 | B1 * | 5/2012 | Parks et al. .................... | 709/224 |
| 8,478,816 | B2 * | 7/2013 | Parks et al. .................... | 709/203 |
| 8,583,090 | B2 * | 11/2013 | Vartiainen ............. | G06F 9/4856 |
| | | | | 455/39 |
| 8,812,601 | B2 * | 8/2014 | Hsieh .................... | G06F 9/4856 |
| | | | | 709/206 |
| 2009/0204966 | A1 | 8/2009 | Johnson et al. | |

(Continued)

FOREIGN PATENT DOCUMENTS

| | | |
|---|---|---|
| WO | 2008/081288 A2 | 7/2008 |
| WO | 2012/135614 A1 | 10/2012 |
| WO | 2012/154748 A1 | 11/2012 |

OTHER PUBLICATIONS

Kanlis, Angelos; Examiner; Extended European Search Report from related European Patent Application No. 13156473.4 dated Jul. 25, 2013; 8 pages.

*Primary Examiner* — Moustafa M Meky
*Assistant Examiner* — Thorne E Waugh
(74) *Attorney, Agent, or Firm* — Thomas S. Grzesik; Fleit Gibbons Gutman Bongini & Bianco P.L.

(57) ABSTRACT

A device is described. The device comprises: a display configured to display first application data; a processor configured to communicate with a further device. The processor is further configured to: detect an event associated with the further device and generate, in response to the detected event, first application data pertaining to a display of second application data associated with applications executable on the further device; and output the first application data to the display. A system and method are also described.

29 Claims, 9 Drawing Sheets

(56) References Cited

U.S. PATENT DOCUMENTS

| | | | |
|---|---|---|---|
| 2010/0082567 A1* | 4/2010 | Rosenblatt | G06F 17/30017 707/705 |
| 2012/0110187 A1* | 5/2012 | Hawkins | H04M 1/72527 709/226 |
| 2013/0080525 A1* | 3/2013 | Aoki | H04L 67/26 709/204 |

* cited by examiner

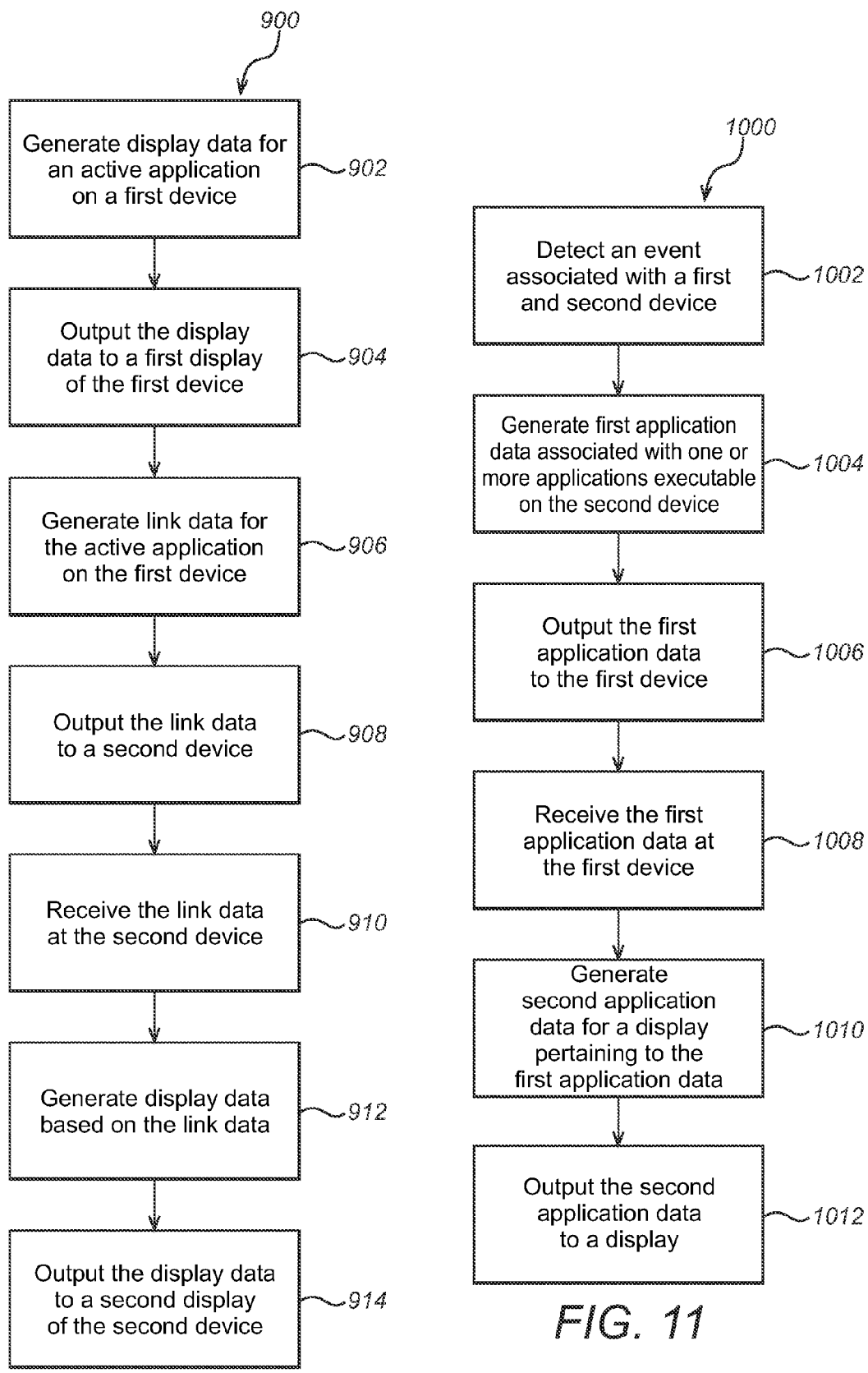

DEVICE, SYSTEM AND METHOD FOR GENERATING APPLICATION DATA

TECHNICAL FIELD

The present disclosure relates to a device, system and method for generating application data.

BACKGROUND

A mobile device is routinely used to perform activities that may be being performed on both the mobile device and another device, e.g. personal computer. Users often want to transfer content from the mobile device to another different device, or complete tasks on one device when they have been started on another device. For example, users may leave and return to their computer several times during the day whilst taking a mobile device with them. Even though some content can be accessed from both a mobile device and a computer, there is a break in the flow of interaction with the content every time a user switches between devices.

BRIEF DESCRIPTION OF THE DRAWINGS

The present disclosure can be understood with reference to the description of the embodiments set out below, in conjunction with the appended drawings in which:

FIG. 10 is a flow diagram showing a method for generating link data; and

FIG. 11 is a flow diagram showing a method for generating display data.

DESCRIPTION

Figure 1:
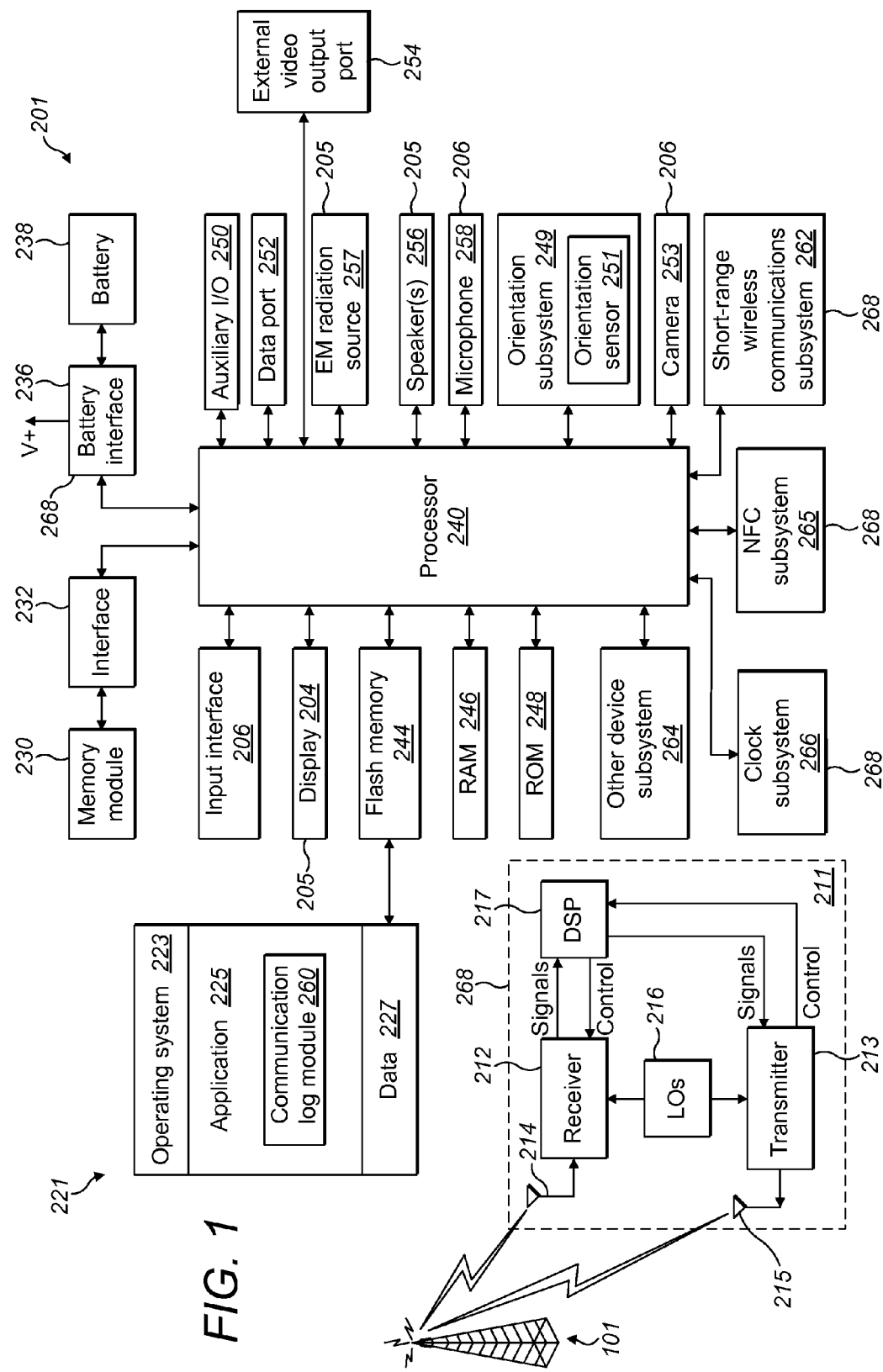
FIG. 1 is a schematic diagram illustrating components of an exemplary electronic device usable by a user in some embodiments.

In a first aspect, there is provided a device comprising: a display configured for displaying first application data; a processor configured to communicate with a further device, the processor being further configured to: detect an event associated with the further device and generate, in response to the detected event, first application data pertaining to a display of second application data associated with an application executable on the further device; and output the first application data to the display.

The first application data generated in response to the detected event may be associated with one or more applications currently being executed and/or displayed on the second device.

The processor may be configured to receive second application data from the further device.

The received second application data may comprise data associated with one or more applications that are incompatible with the further device.

The received second application data may comprise data associated with applications that are dependent on the capability of the further device.

The device may comprise an input device configured to generate input data based on user selected first application data from the displayed first application data.

The processor may be configured to execute an application in conjunction with the second application data based on the user selected first application data.

The processor may be configured to determine the capability of the device and output the first application data for display based on the determined device capability.

The second application data may comprise one or more of: application type data, file data, a pointer to remotely stored file data, user entered characters and a message item.

The first application data may comprise a list of items associated with the second application data.

The detected event may be one or more of: an establishment of communication between the processor and the further device; a user interaction with the device; determination of a distance between the device and the further device being greater than a predefined distance; determination of a distance between the device and the further device being less than a predefined distance; detected movement of the device; and the device being left idle for a predefined time. For example, the first processor may be configured to determine its proximity to the further device, and based on the determined proximity generate the application data. In one embodiment, when the proximity between the first processor and further device is determined to be less than or more than a predefined distance, e.g. than 50 m, 40 m, 30 m, 20 m, 10 m, 9 m, 8 m, 7 m, 6 m, 5 m, 4 m, 3 m, 2 m, 1 m, 0.5 m, 0.2 m or 0.1 m.

The second application data may comprise data associated with one or more applications currently active on the further device, or applications which have previously been active on the further device.

The second application data may comprise data associated with one or more applications that previously failed to execute on the further device and/or previously executed on the further device with reduced performance.

The second application data may comprise data associated with one or more applications active on the further device within a predetermined time period.

The time period may be determined based on the elapsed time since a previous event.

In a second aspect, there is provided a device comprising: a processor configured to communicate with a further device, the processor being further configured to: detect an event associated with the further device and generate, in response to the detected event, application data associated with one or more applications executable on the device; and output the application data to the further device.

The application data generated in response to the detected event may be associated with one or more applications currently being executed and/or displayed on the device.

In a third aspect, there is provided a system comprising: a first device and an second device in communication with the first device; the first device comprising: a display configured to display first application data; a first processor configured to communicate with the second device, the first processor being further configured to: detect an event associated with the second device and generate, in response to the detected event, first application data pertaining to a display of second application data associated with one or more applications executable on the second device; and output the first application data to the display; the second device comprising: a second processor configured to communicate with the first device, the second processor being further configured to: detect an event associated with the second device and generate, in response to the detected event, the second application data; and output the application data to the first device.

In a fourth aspect, there is provided a method for a device, the method comprising: establishing communication with a further device; detecting an event associated with the further device and generating, in response to the detected event, first application data pertaining to a display of second application data associated with applications executable on the further device; and outputting the first application data to a display of the device.

The method may comprise receiving second application data from the further device.

The received second application data may comprise data associated with one or more applications that are incompatible with the further device.

The received second application data may comprise data associated with one or more applications that are dependent on the capability of the further device.

The method may comprise generating input data based on user selected first application data from the displayed first application data.

The method may comprise executing an application in conjunction with the second application data based on the user selected first application data.

The method may comprise determining the capability of the device and outputting the first application data for display based on the determined device capability.

The second application data may comprise one or more of: application type data, file data, a pointer to remotely stored file data, user entered characters and a message item.

The first application data may comprise a list of items associated with the second application data.

The detected event may be one or more of: an establishment of communication between the processor and the further device; a user interaction with the device; a distance between the device and the further device being determined to be greater than a predefined distance; a distance between the device and the further device being determined to be less than a predefined distance; detected movement of the device; and the device being left idle for a predetermined time.

The second application data may comprise data associated with one or more applications currently active on the further device, or previously active on the further device.

The second application data may comprise data associated with one or more applications that previously failed to execute on the further device or previously executed on the further device with reduced performance.

The second application data may comprise data associated with one or more applications active on the further device within a predetermined time period.

The time period may be determined based on the elapsed time since a previous event.

In a fifth aspect, there is provided a method for a device, the method comprising: establishing communication with a further device; detecting an event associated with the device and generating, in response to the detected event, application data associated with one or more applications executable on the device; and outputting the application data to the further device.

In a sixth aspect, there is provided a method for a system comprising a first device and a second device in communication with the device, the method comprising: establishing communication between the first device and the second device; detecting an event associated with the first device and the second device; generating, in response to the detected event, first application data associated with one or more applications executable on the second device, and outputting the first application data to the first device; generating, in response to the detected event, second application data pertaining to a display of the first application data, and outputting the second application data to a display of the first device.

The first application data generated in response to the detected event may be associated with one or more applications currently being executed and/or displayed on the second device.

In a seventh aspect, there is provided a computer-readable medium comprising executable instructions which, when executed, cause a processor to perform the above methods. The executable instructions may be computer-executable instructions. A device may be configured to receive the executable instructions from the computer-readable medium, and/or comprise the executable instructions, and be configured to execute the executable instructions.

In an eighth aspect, there is provided a device configured to perform one or more of the above methods. The device may further comprise a processor configured to perform one or more of the above methods. The processor may comprise one or more discrete electronic components.

Reference is made to FIG. 1 which illustrates an exemplary electronic device 201 which is usable in accordance with the disclosure below. An electronic device 201 such as the electronic device 201 of FIG. 1 is configured to generate a user-controllable interface on a built-in display or on a remote, external display device, or on a built-in display and on a remote, external display device. In the context of this disclosure, the term "remote" means a display screen which is not built-in to the electronic device 201 with which the electronic device 201 communicates via a physical wired connection or via a wireless connection.

It will be appreciated that, in other embodiments, some of the features, systems or subsystems of the electronic device 201 discussed below with reference to FIG. 1 may be omitted from electronic devices 201 which are intended to perform solely operations in relation to the generation and output of display data and the modification of media content output.

In the illustrated exemplary embodiment, the electronic device 201 is a communication device and, more particularly, is a mobile communication device having data and voice communication capabilities, and the capability to communicate with other computer systems; for example, via the Internet. It will be appreciated that the electronic device 201 may take other forms, including any one of the forms listed below. Depending on the functionality provided by the electronic device 201, in certain exemplary embodiments, the electronic device 201 is a multiple-mode communication device configured for both data and voice communication, a mobile telephone, such as a smartphone, a wearable computer such as a watch, a tablet computer, a personal digital assistant (PDA), or a computer system such as a notebook, laptop or desktop system. The electronic device 201 may take other forms apart from those specifically listed above. The electronic device 201 may also be referred to as a mobile communications device, a communication device, a mobile device and, in some cases, as a device. In the context of this disclosure, the term "mobile" means the device is of a size or weight which makes it readily portable by a single individual, e.g. of a weight less than 5, 4, 3, 2, 1, 0.5, 0.4, 0.3, 0.2 or 0.1 kilograms, or of a volume less than 15,000, 10,000, 5,000, 4,000, 3,000, 2,000, 1,000, 500, 400, 300, 200, 100, 90, 80, 70, 60, 50, 40, 30, 20, 10 or 5 cubic centimeters. As such, the device 201 may be portable in a bag, or clothing pocket.

The electronic device 201 includes a controller including a processor 240 (such as a microprocessor) which controls the operation of the electronic device 201. In certain electronic devices, more than one processor is provided, with each processor in communication with each other and configured to perform operations in parallel, so that they together control the overall operation of the electronic device. The processor 240 interacts with device subsystems, such as a wireless communication subsystem 211 for exchanging radio frequency signals with a wireless network 101 to perform communication functions. The processor 240 is communicably coupled with additional device subsystems including one or more output interfaces 205 (such as one or more of: a display 204, a speaker 256, electromagnetic (EM) radiation source 257), one or more input interfaces 206 (such as one or more of: a camera 253, microphone 258, keyboard (not shown), control buttons (not shown), a navigational input device (not shown), a touch-sensitive overlay (not shown)) associated with a touchscreen 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), an external video output port 254, a near field communications (NFC) subsystem 265, a short-range communication subsystem 262, a clock subsystem 266, a battery interface 236, and other device subsystems generally designated as 264. Some of the subsystems shown in FIG. 1 perform communication-related functions, whereas other subsystems may provide "resident" or on-device functions.

The electronic device 201 stores data 227 in an erasable persistent memory, which in one exemplary embodiment is the flash memory 244. In various exemplary embodiments, the data 227 includes service data including information used by the electronic device 201 to establish and maintain communication with the wireless network 101. The data 227 may also include user application data such as email messages, address book and contact information, calendar and schedule information, notepad documents, presentation documents and information, word processor documents and information, spread sheet documents and information; desktop publishing documents and information, database files and information; image files, video files, audio files, internet web pages, and other commonly stored user information stored on the electronic device 201 by its user, and other data. The data may also include program application data such as functions, controls and interfaces from an application such as an email application, an address book application, a calendar application, a notepad application, a presentation application, a word processor application, a spread sheet application, a desktop publishing application, a database application, a media application such as a picture viewer, a video player or an audio player, and a web browser. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 includes a clock subsystem or module 266 comprising a system clock configured to measure system time. In one example, the system clock comprises its own alternate power source. The system clock provides an indicator of a current time value, the system time, represented as a year/month/day/hour/minute/second/milliseconds value. In other examples, the clock subsystem 266 additionally or alternatively provides an indicator of the current time value represented as a count of the number of ticks of known duration since a particular epoch.

The clock subsystem 266, the communication subsystem 211, the NFC subsystem, 265, the short-range wireless communications subsystem 262, and the battery interface 236 together form a status report subsystem 268 which is configured to provide an indicator of the operating status of the device.

The display 204 receives display data generated by the processor 240, such that the display 204 displays certain application data stored as a segment of the data 227 from the memory (any of the flash memory 244, random access memory (RAM) 246, read only memory (ROM) 248) in a predetermined way on display screen (not shown) of the display 204, according to the processing performed by the processor 240.

In certain exemplary embodiments, the external video output port 254 is integrated with the data port 252. The external video output port 254 is configured to connect the electronic device 201 via a wired connection (e.g. video graphics array (VGA), digital visual interface (DVI) or high definition multimedia interface (HDMI)) to an external (or remote) display device 290 which is separate and remote from the electronic device 201 and its display 204. The processor 240 outputs external display data generated by the processor 240 via the external video output port 254, such that the external display device 290 can display application data from the memory module in a predetermined way on an external display screen (not shown) of the external display device 290. The processor 240 may also communicate the external display data to the external display device 290 in a similar fashion over a wireless communications path.

At any given time, the display data and the external display data generated by the processor 240 may be identical or similar for a predetermined period of time, but may also differ for a predetermined period of time, with the processor 240 controlling whether the display data and the external display data are identical or differ based on input from one or more of the input interfaces 206. In this context, the word "identical" means that both sets of data comprise similar content so as to generate an identical or substantially similar display at substantially the same time on both the external display device 290 and the display 204. In this context, the word "differ" means that the external display data and display data are not identical; this is to say that these data may (but not necessarily) include identical elements of data, for example representative of the same application data, but the external display data and display data are not wholly identical. Hence, the display on both the external display device 290 and the display 204 are not wholly identical, although similar or identical individual items of content based on the application data may be displayed on both the external display device 290 and the display 204.

In at least some exemplary embodiments, the electronic device 201 includes a touchscreen which acts as both an input interface 206 (e.g. touch-sensitive overlay) and an output interface 205 (i.e. display). The touchscreen may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The processor 240 is in communication with the memory and the touch-sensitive input interface 206 to detect user input via the input interface 206. The processor 240 then generates or updates display data comprising a display object for display by the display device 204 in accordance with the user input. The processor 240 then outputs the display data for display on the display device 204. In an example, the user input comprises a swipe gesture across the touchscreen interface 206.

In at least some exemplary embodiments, the touch-sensitive overlay has a touch-sensitive input surface which is larger than the display 204. For example, in at least some exemplary embodiments, the touch-sensitive overlay may extend overtop of a frame (not shown) which surrounds the display 204. In such exemplary embodiments, the frame (not shown) may be referred to as an active frame since it is capable of acting as an input interface 206. In at least some exemplary embodiments, the touch-sensitive overlay may extend to the sides of the electronic device 201.

As noted above, in some exemplary embodiments, the electronic device 201 includes a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217 which is in communication with the processor 240. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate.

In at least some exemplary embodiments, the electronic device 201 communicates with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some exemplary embodiments, the auxiliary input/output (I/O) subsystems 250 include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some exemplary embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some exemplary embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some exemplary embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some exemplary embodiments, specifies the orientation of the device 201 relative to the gravitational field of the earth. Additionally or alternatively, the orientation sensor 251 may generate orientation data which specifies the orientation of the device relative to known locations or fixtures in a communication network.

In some exemplary embodiments, the orientation subsystem 249 includes other orientation sensors 251, instead of or in addition to accelerometers. For example, in various exemplary embodiments, the orientation subsystem 249 may include a gravity sensor, a gyroscope, a tilt sensor, an electronic compass or other suitable sensor, or combinations thereof. In some exemplary embodiments, the device orientation subsystem 249 may include two or more orientation sensors 251 such as an accelerometer and an electronic compass.

The electronic device 201, in at least some exemplary embodiments, includes a Near-Field Communication (NFC) subsystem 265. The NFC subsystem 265 is configured to communicate with other electronic devices 201 or tags, using an NFC communications protocol. NFC is a set of short-range wireless technologies which typically require a distance of 4 cm or less for communications. The NFC subsystem 265 may include an NFC chip and an NFC antenna. In such an embodiment, the orientation sensor 251 may generate data which specifies a distance between the electronic device 201 and an NFC transceiver.

The electronic device 201 includes a microphone or one or more speakers. In at least some exemplary embodiments, an electronic device 201 includes a plurality of speakers 256. For example, in some exemplary embodiments, the electronic device 201 includes two or more speakers 256. The two or more speakers 256 may, for example, be disposed in spaced relation to one another. That is, in at least some exemplary embodiments, the electronic device 201 may include a first speaker and a second speaker and the first speaker and the second speaker may be spatially separated from one another within the electronic device 201. In at least some exemplary embodiments, the display 204 may be disposed between the first speaker and the second speaker of the electronic device. In such exemplary embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display.

In at least some exemplary embodiments, each speaker 256 is associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some exemplary embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 or the housing of the electronic device 201. In such exemplary embodiments, the direction of capture of the camera is always predictable relative to the display 204 or the housing.

In at least some exemplary embodiments, the camera may be provided in a central location relative to the display 204 to facilitate image acquisition of a face.

In at least some exemplary embodiments, the electronic device 201 includes an electromagnetic (EM) radiation source 257. In at least some exemplary embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some exemplary embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images detected by the camera.

In some exemplary embodiments, the electromagnetic radiation source 257 is an infrared (IR) radiation source which is configured to emit infrared radiation. In at least some exemplary embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some exemplary embodiments, the camera 253 is configured to capture at least some electromagnetic radiation which is not in the visible spectrum.

In some exemplary embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. In at least some exemplary embodiments, the short-range communication subsystem 262 is a wireless bus protocol compliant communication mechanism such as a Bluetooth® communication module to provide for communication with similarly-enabled systems and devices.

Any one or more of the communication subsystem 211, the NFC subsystem 265 and the short-range wireless communications subsystem 262 serves as a "communication subsystem" which is configured to provide an indicator of an incoming message being received by the electronic device 201. The incoming message may be an email, a message received via a social networking website, an SMS (short message service) message, or a telephone call, for example.

The electronic device 201 is, in some exemplary embodiments, a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 can compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such as a media player module 260. In the exemplary embodiment of FIG. 1, the media player module 260 is implemented as a stand-alone application 225. However, in other exemplary embodiments, the presentation module 260 could be implemented as part of the operating system 223 or other applications 225.

As discussed above, electronic devices 201 which are configured to perform operations in relation to a communications log may take a variety of forms. In at least some exemplary embodiments, one or more of the electronic devices which are configured to perform operations in relation to the presentation module 260 are a smart phone or a tablet computer.

Figure 2:
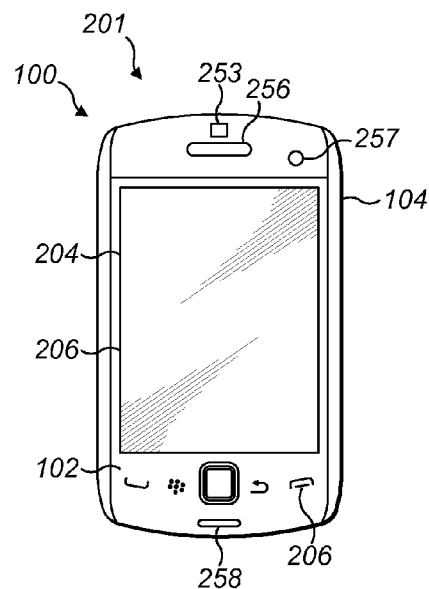
FIG. 2 is a plan view of the upper external side of one exemplary electronic device usable by an end-user in some embodiments.

Referring now to FIG. 2, a front view of an exemplary electronic device 201 which in one example may be a smartphone 100 is illustrated. The smartphone 100 is a mobile phone which offers more advanced computing capability than a basic non-smartphone cellular phone. For example, the smartphone 100 may have the ability to run third party applications which are stored on the smartphone.

The smartphone 100 includes all of the components discussed above with reference to FIG. 1, or a subset of those components. The smartphone 100 includes a housing 104 which houses at least some of the components discussed above with reference to FIG. 1.

In the exemplary embodiment, the smartphone includes a display 204, which may be a touchscreen which acts as an input interface 206. The display 204 is disposed within the smartphone 100 so that it is viewable at a front side 102 of the smartphone 100. That is, a viewable side of the display 204 is disposed on the front side 102 of the smartphone. In the exemplary embodiment illustrated, the display 204 is framed by the housing 104.

The example smartphone 100 also includes other input interfaces 206 such as one or more buttons, keys or navigational input mechanisms. In the example illustrated, at least some of these additional input interfaces 206 are disposed for actuation at a front side 102 of the smartphone.

The example smartphone also includes a speaker 256. In the exemplary embodiment illustrated, the smartphone includes a single speaker 256 which is disposed vertically above the display 204 when the smartphone 100 is held in a portrait orientation where its height is longer than its width. The speaker 256 may be disposed on the front face of the smartphone 100.

While the example smartphone 100 of FIG. 2 includes a single speaker 256, in other exemplary embodiments, the smartphone 100 may include a greater number of speakers 256. For example, in at least some exemplary embodiments, the smartphone 100 may include a second speaker 256 which is disposed vertically below the display 204 when the smartphone is held in a portrait orientation where its height is longer than its width (i.e. the orientation illustrated in FIG. 2).

The example smartphone 100 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 100 also includes a front facing camera 253 which may be located vertically above the display 204 when the smartphone 100 is held in a portrait orientation where its height is longer than its width. The front facing camera 253 is located so that it may capture images of objects which are located in front of or surrounding the front side of the smartphone 100.

The example smartphone 100 also includes an electromagnetic radiation source 257. The electromagnetic radiation source 257 is disposed on the front side 102 of the smartphone 100. In this orientation, electromagnetic radiation which is produced by the electromagnetic radiation source 257 may be projected onto objects which are located in front of or surrounding the front side of the smartphone 100. Such electromagnetic radiation (or the projection of electromagnetic radiation onto objects) may be captured on images detected by the camera 253.

Figure 3:
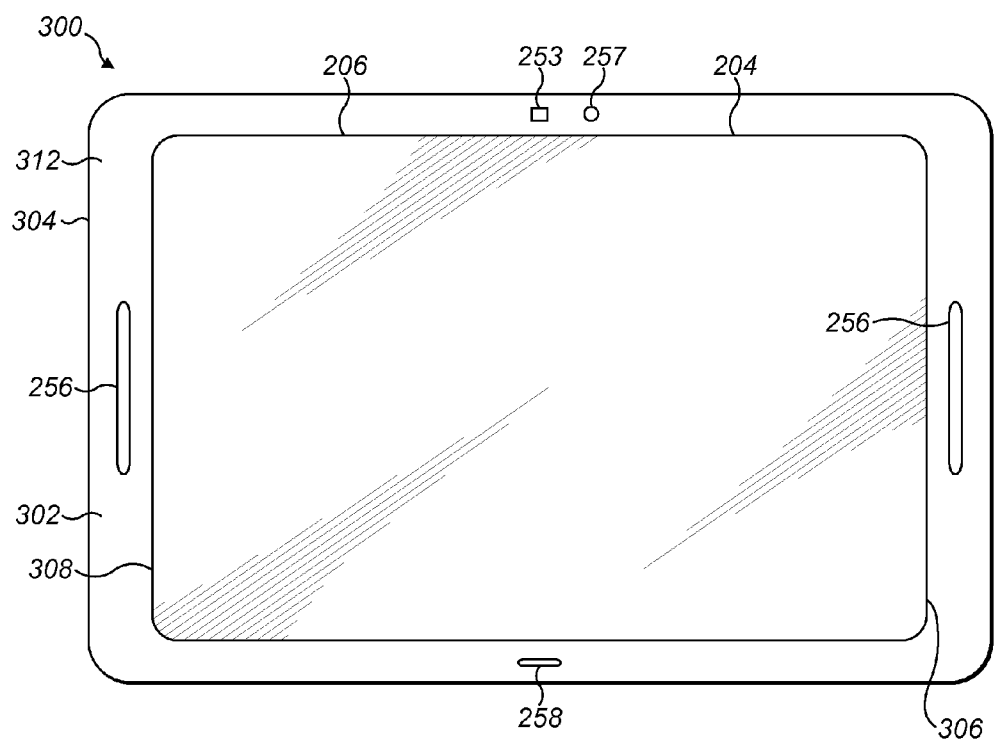
FIG. 3 is a plan view of the upper external side of one alternative exemplary electronic device usable by an end-user in some embodiments.

Referring now to FIG. 3, a front view of an example electronic device 201, which in one example may be a tablet computer 300, is illustrated. The tablet computer 300 may include the components discussed above with reference to FIG. 1 or a subset of those components. The tablet computer 300 includes a housing 304 which houses at least some of the components discussed above with reference to FIG. 1.

The tablet computer 300 includes a display 204, which may be a touchscreen which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the exemplary embodiment illustrated, the display 204 is framed by the housing 304.

A frame 312 surrounds the display 204. The frame 312 is portion of the housing 304 which provides a border around the display 204. In at least some exemplary embodiments, the frame 312 is an active frame 312. That is, the frame has a touch sensitive overlay which allows the electronic device 201 to detect a touch applied to the frame thus allowing the frame 312 to act as an input interface 206 (FIG. 1).

The exemplary tablet computer 300 includes a plurality of speakers 256. In the exemplary embodiment illustrated, the tablet includes two speakers 256. The two speakers 256 are disposed on opposing sides of the display 204. More particularly, when the tablet computer 300 is held in a landscape orientation (such as the orientation illustrated in FIG. 3) where its width is longer than its height, one of the two speakers is disposed on a right side 306 of the display 204 and one of the speakers is disposed on the left side 308 of the display 204.

Both speakers 256 are disposed on the front side 302 of the tablet computer 300.

The exemplary tablet computer 300 also includes a microphone 258. In the example illustrated, the microphone 258 is vertically disposed below the display 204 when the tablet computer is held in the landscape orientation illustrated in FIG. 3. The microphone 258 may be located in other locations in other exemplary embodiments.

The exemplary tablet computer 300 also includes a front facing camera 253 which may be located vertically above the display 204 when the tablet computer 300 is held in a landscape orientation (i.e. the orientation of FIG. 3). The front facing camera 253 is located so that it may capture images of objects which are located in front of or surrounding the front side of the tablet computer 300.

The example tablet computer 300 also includes an electromagnetic radiation source 257. The electromagnetic radiation source 257 is disposed on the front side 304 of the tablet computer 300. In this orientation, electromagnetic radiation which is produced by the electromagnetic radiation source 257 may be projected onto objects which are located in front of or surrounding the front side 302 of the tablet computer 300. Such electromagnetic radiation (or the projection of electromagnetic radiation onto objects) may be captured on images detected by the camera 253.

The tablet computer 300 may have the ability to run third party applications which are stored on the tablet computer.

The electronic device 201, which may be tablet computer 300, is usable by an end-user to send and receive communications using electronic communication services supported by a service provider.

The end-user of an electronic device 201 may send and receive communications with different entities using different electronic communication services. Those services may or may not be accessible using one or more particular electronic devices. For example, a communication source of an end-user's text messages sent and received by an end-user using a particular electronic device 201 having a particular memory module 230, such as a USIM, may be accessible using that device 201, but those text messages may not be accessible using another device having a different memory module. Other electronic communication sources, such as a web-based email account, may be accessible via a web-site using a browser on any internet-enabled electronic device.

Figure 4:
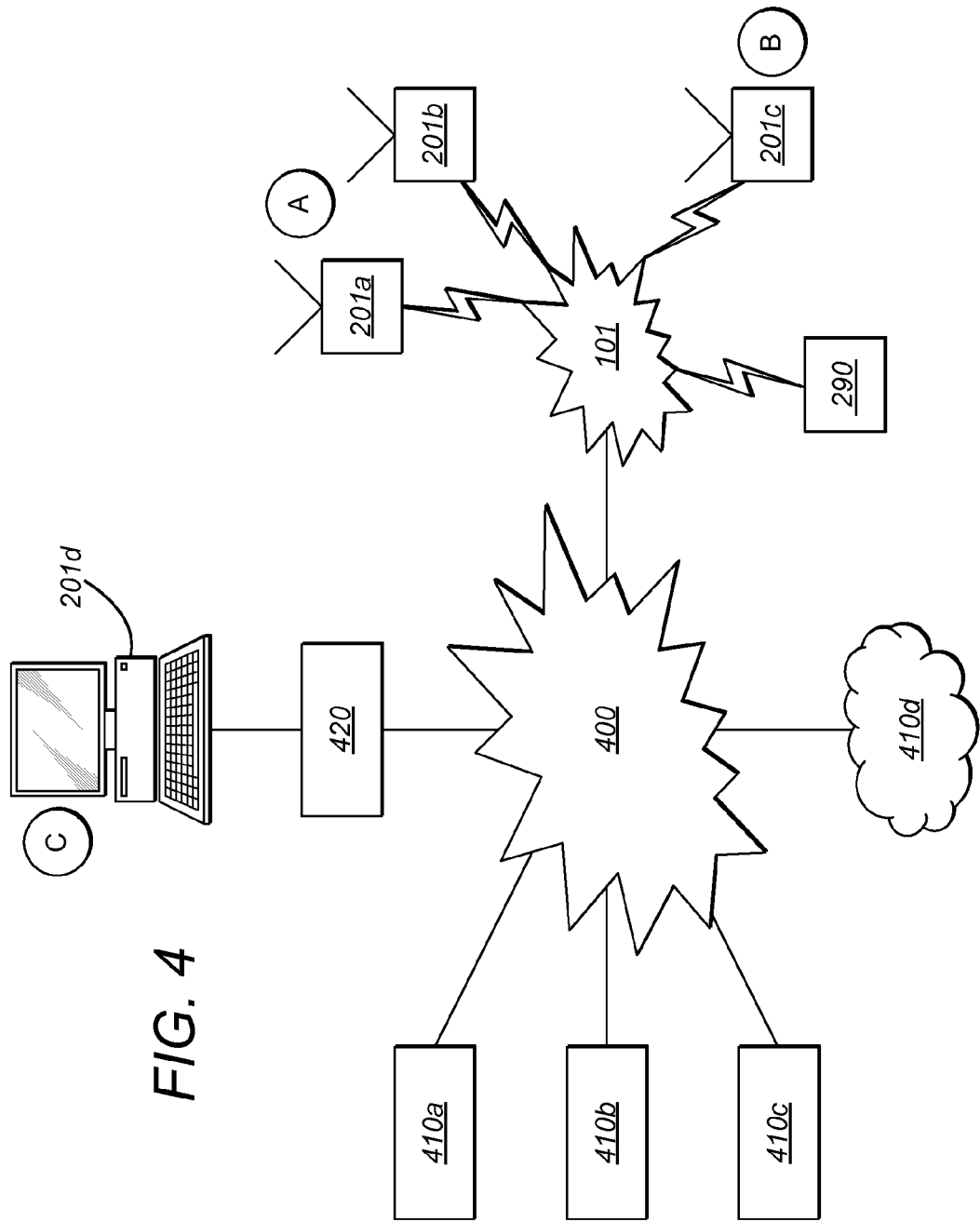
FIG. 4 is a schematic diagram of an exemplary system in which the aforementioned electronic devices can be employed in some exemplary embodiments.

FIG. 4 shows a system of networked apparatus by which electronic communications can be sent and received using multiple electronic devices 201a, 201b, 201c. Referring to FIG. 4, electronic devices 201a, 201b and 201c are connected to wireless network 101 to perform voice and data communications, and to transmit data to an external display device 290 residing on the wireless network. Wireless network 101 is also connected to the communications network 400, e.g. Internet. Electronic device 201a may be a tablet computer similar to tablet computer 300 described in FIG. 2 above. Electronic devices 201b and 201c may be smartphones. Electronic device 201d is a computing device such as a notebook, laptop or desktop, which is connected by a wired broadband connection to Local Area Network 420, and which is also connected to the communications network 400. Electronic devices 201a, b, c, d may access the communications network 400 to perform data communications therewith.

Servers 410a, 410b, 410c and 410d are also connected to the communications network 400 and one or more of them may individually or together support electronic communications services available to end-users of electronic devices 201a, 201b, 201c and 201d, enabling them to send and receive electronic communications. Servers 410a, 410b, 410c and 410d may be web servers or communications servers, such as email servers.

Other servers and services may of course be provided allowing users of electronic devices 201a, 201b, 201c and 201d to send and receive electronic communications by, for example, Voice over IP phone calls, video IP calls, video chat, group video chat, blogs, file transfers, instant messaging, and feeds.

Wireless network 101 may also support electronic communications without using communications network 400. For example, a user of smart phone 201b may use wireless network 101 to make telephony calls, video calls, send text messages, send multimedia messages, and send instant messages to smart phone 201c, and to display application data on a display screen of the external display device 290, or control the display of application data.

The example shown in FIG. 4 is intended to be non-limiting and additional network infrastructure may of course be provided, such as a Public Switched Telephone Network (not shown), which may be used, for example, to make telephony calls using smartphone 201b to a wired phone (not shown).

In order to explain certain example modes of operation, reference is made below to FIGS. 5 to 9.

Figure 5:
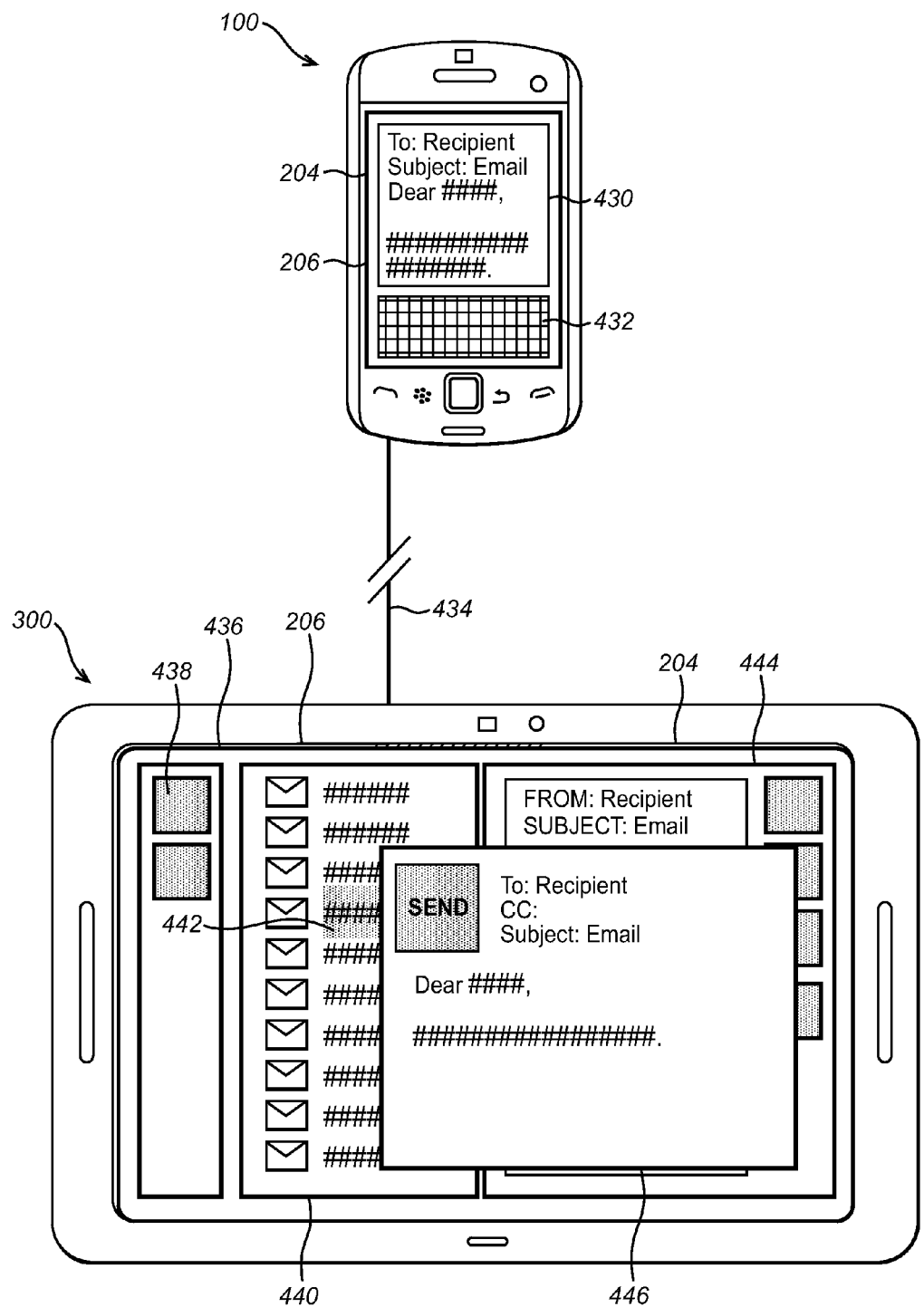
FIG. 5 illustrates the two devices of FIGS. 2 and 3 in communication with each another.

FIG. 5 illustrates the device 100 and device 300 illustrated in FIGS. 2 and 3 respectively. The second device 300 may be a device, and will be referred to herein as device 300, but may be one of the other alternative devices discussed above. The device 100 is illustrated with a display object 430 that is generated and output by the processor 240 to the display screen 204 of the device 100.

Selectable display objects are executable on the device 100 that may be representative of an application stored in the memory (flash memory 244) or installed on the device 100. In this case, responsive to detection of a user input selecting the selectable display object, the processor 240 'opens' or 'runs' the application (i.e. begins execution of the instructions associated with the application).

A display object corresponding to a process may be 'maximized' so that no other display objects are visible. For example, if the processor 240 is executing a process causing output of an image, the image may be viewed using the 'full screen' thereby preventing any further display objects from being simultaneously viewed. Alternatively, it may be possible to view multiple display objects simultaneously on the display 204. These multiple display objects may be connected with the operation of a single given process or application which is being executed or performed by the processor 240. Additionally, one or more display objects may be displayed so as to partially overlay other display objects, thereby obscuring the view of the other display objects.

In this exemplary embodiment, display object 430 is representative of a message composition screen or window of a message application that is currently active and a user is editing or working on. It will appreciate that the message composition may be minimised or reduced and not currently displayed, but may still be described as an active application currently being executed. The display data for a display object is generated by the processor 240 of the device 100 for an application executable on the device 100, when executed, where the display data pertains to the executable application. In this example, an email message composition window is depicted, where the display data for generating the display pertains to a message composition application. The message composition application includes one or more elements, for example, the type of application and user entered text fields (e.g., subject, recipient, body of the message).

It will be appreciated that other types of message or composition windows may be used (e.g., text, multimedia or SMS message). Furthermore, embodiments are not limited to messaging and also include other applications or programs that allow a user to enter/edit text or characters. For example, the display object 430 may be a word processing application or an internet browser application.

In addition to the message composition window 430, there is also depicted a keyboard 432 that is generated by the processor 240 to allow input via a touchscreen or input interface 206 of the device 100.

The device 100 is depicted with the message composition window before a communication connection is established with another second, or further (e.g., auxiliary) device. In this exemplary embodiment a user is composing an email message on the device 100.

A further device 300 is depicted in FIG. 5. The device 300 corresponds to the device 300 illustrated in FIG. 3. The mobile device 100 and device 300 establish a communication connection via their respective short-range communication subsystems 262. In at least some exemplary embodiments, the short-range communication subsystem 262 is a wireless bus protocol compliant communication mechanism such as a Bluetooth® communication module to provide for communication between the two similarly-enabled devices. Alternatively, the two devices 100, 300 may be connected or docked using a physical connection, such as a USB cable via the devices 100, 300 respective auxiliary I/O subsystems 250, or a high-definition multimedia interface or HDMI. The communication channel is depicted in the figure with a solid black line 434 which could be a wireless or wired connection.

When the connection is established between the two devices, the processor 240 of the device 100 generates application data, or link data. The term link data is used to refer to data that is generated by the processor 240 of the device 100 by interrogating applications or programs executable on the device 100. The link data is subsequently communicated to a further device (device 300) and comprises data related to, in this example, any applications or programs currently running on the device 100. The link data may include various aspects or elements of the application, including display data for display by the further device 300, data related to the application, such as, for example, the name of an application, an application type (e.g., message composer, word processor or internet browser), version data, and/or data on any characters that have been entered (e.g., text, body of an email, subject of an email, or recipient contact details/email address) in an application currently active or running on the device 100. It will be appreciated that if multiple applications are active or running on the mobile device 100 multiple sets of link data may be generated.

In the example of the link data comprising display data, the display data may be display data to enable a second display to copy or replicate the display of a first device or may only comprise one or more elements of an application, which when combined with other elements, not forming part of the display on the first device, form a complete display for a second device that is different in appearance than the display of the first device.

The processor 240 of the device 100, as part of the communication establishment, obtains data on the capability of the device 300 received from the device 300. The capability data may include the processing capability of the device 300 and the display resolution of the device 300. The transfer of capability data from the device 300 to the device 100 is optionally performed to determine what type of link data should be generated and output. For example, if the device does not include a specific application or does not have sufficient processing capability to run or execute applications, the link data may include display data. Alternatively, the link data generated may include link data for launching an application and generating display data for display on the device 300. If the link data includes link data for launching an application and generating a display, the device receiving the link data may communicate to the device 100 that it is able to launch an application based on the link data, such that it is no longer necessary to output display data for generating a display to the device 300. Alternatively, the device receiving the link data may communicate to the device 100 that it is not capable of launching an application and the device 100 may continue to generate and output only display data for generating a display. In such an example, the device 100 may continue to generate and communicate link data that includes data relating to elements of an active application and display data unless the receiving device communicates otherwise.

The processor 240 communicates or transmits the link data to the device 300 via the established communication channel 434. The establishment of the communication connection 434 may be referred to as an event and will trigger the processor 240 to generate the link data and communicate it to the device 300. Furthermore, the link data may be transmitted to the device 300 as part of the connection establishment protocol.

The processor 240 of the device 300 receives the link data via its respective short-range communication subsystem 262. In this example, the device 300 will act upon the received link data without intervention from a user. That is to say that the user is not provided with an option whether or not to act on the received link data.

In this exemplary embodiment, the link data that is generated by the processor 240 of the mobile device 100 relates to the message composition window 430 that is currently active or open on the display 204 of the device 100. The link data in this exemplary embodiment comprises data on the currently active application, which comprises a message composition application type, and user entered data or characters which comprise the address (e.g., email address) of the recipient in the active composition window, any characters entered in the subject line and any characters entered in the body of the message (e.g., email).

The link data, as described above, is communicated to the device 300 via the established communication channel 434. In this exemplary embodiment, the determined capability data of the device 100 received from the device 300 indicates that the device is capable of running or executing applications. Therefore, based on the determined capability, the link data comprises data to allow the device 300 to launch an application.

The device 300 receives the link data from the device 100 and launches or executes an application based on the application type data contained in the link data. In this exemplary embodiment the application type is a message composition application. Accordingly, the processor 240 of the device 300 launches or opens a message composition application 436, stored within memory, and generates display data pertaining to the message composition application for display on the display 204 of the device 300, as is illustrated in FIG. 5. The device 300 includes a large display 204 (i.e., the display 204 of the device 300 has a greater area than the device 100) so that the corresponding application 436 includes more functionality than the similar application 430 executed on the device 100. In this exemplary embodiment, the message application 436 launched on the display 204 of the device 300 includes one or more selectable display objects 438 arranged on the left hand side of the message application 436. For example, the selectable display objects 438, when selected may launch a search function to search for message items and or access to other message folders. The message application 436 further includes a list of message items 440, which are illustrated using envelope icons indicative of an email application, but it will appreciated that other icons or display objects may be used. Each display object may include brief details of the message, for example, sender, subject and data/time details. One of the messages 442 is highlighted, for example if selected by a user, which causes the message application to provide an expanded view of the message 444, as illustrated on the right hand side of the message application 436. The expanded view of message 444 also includes selectable display objects or icons for a user to select an action related to the message item, for example, reply, forward and delete.

The link data received by the processor 240 of the device 300 in this exemplary embodiment includes data on a message being composed. Accordingly, in further response to the link data a new composition window 446 is launched or opened by the processor 240 of the device 300 and the data contained in the link data is entered in the new composition window 446. In this example, the recipient, subject and character of the body of the message is copied to the newly launched message composition window from the link data. Accordingly, a user is able to continue editing the message and may send the message when complete via the device 300.

In this example, after the link data is sent to the device 300, any open or active applications may be closed by the processor 240 of the device 100. Alternatively, any active applications, including an open message composition window, may remain open until a user returns to the device 100, where the user may make a selection to close any applications and incomplete messages, for example.

Thus, in this exemplary embodiment, a user is able to continue composing an email on a larger device 300 that was initially being composed on a smaller, handheld, device 100 when the two devices 100, 300 are docked or connected to one another to allow for communication to be established.

Figure 6:
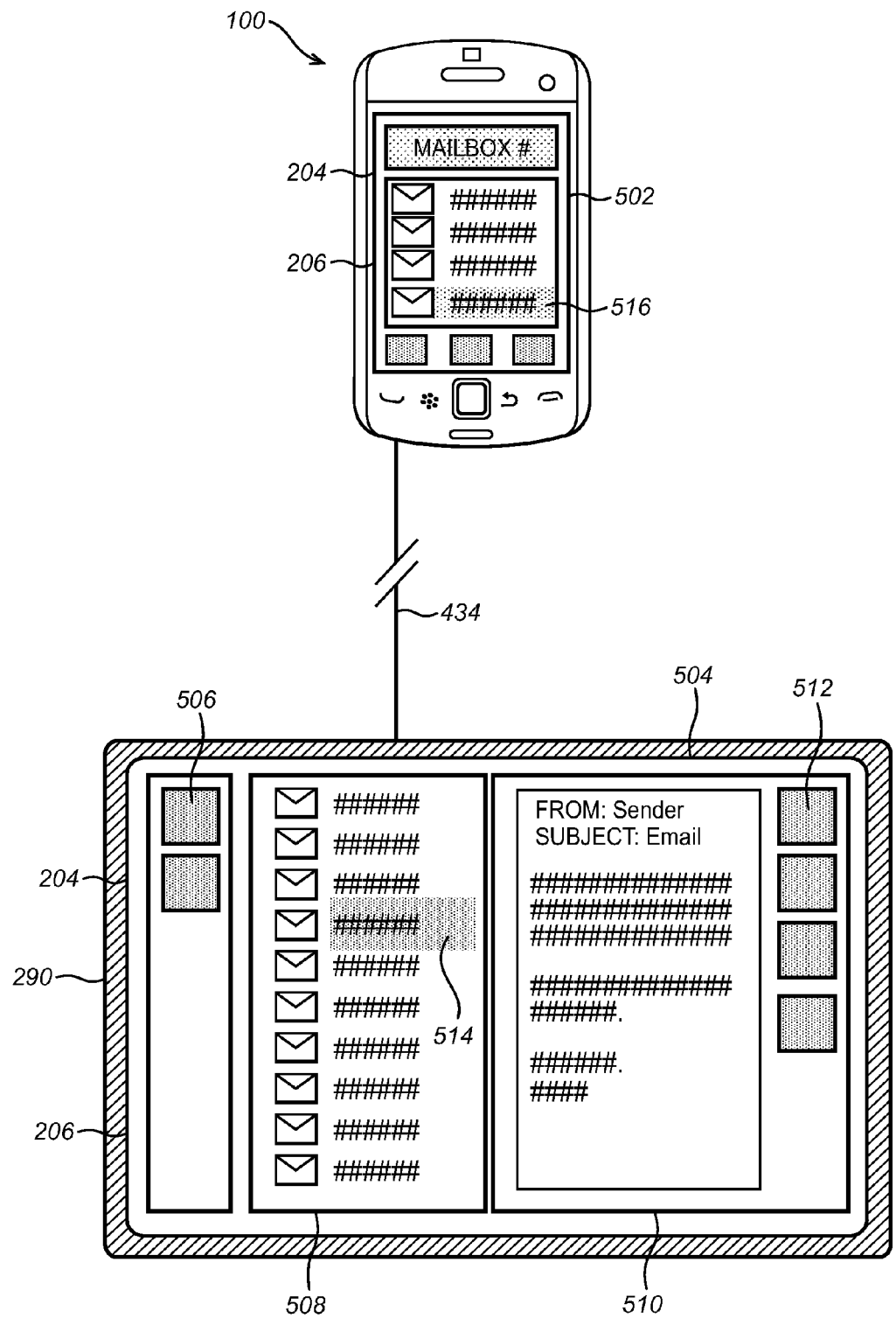
FIG. 6 illustrates a first device and a display device in communication with each another.

FIG. 6 illustrates a similar arrangement of a device 100 and a device 290. In the exemplary embodiment illustrated in FIG. 6, the device 290 is similar to the device 300 illustrated in FIG. 5, except, the device 290 has a reduced functionality to the extent that it is not capable of executing or launching applications, and may be considered to be a display device 290, for example a monitor.

A described above, when the device 100 is docked or connected with the display device 290, the device 100 determines the capabilities of the display device 290. In the exemplary embodiment, the device 100 communicates with the display device 290 to determine the display and processing capabilities of the display device 290. In this example, the display device is determined to be incapable of launching applications, but includes a larger display 204 than the display of the device 100. Thus, in this exemplary embodiment the larger display 204 of the display device 290 may be used to display an application open or running on the device 100, but with a larger, more functional user interface. The communication channel 434 in this example may be performed via the auxiliary input/output (I/O) subsystems 250, the data port 252 or the external video output port 254, described above.

The device 100, following the establishment of a connection and the determination of the capabilities of the display device 290, will generate link data related to the currently active or open application by interrogating the currently active or open application. In this exemplary embodiment, the active application is a message application 502. The display 204 of the device 100 is small in size, so as is typically known in the art, only the composition window is displayed, without displaying other related display objects, for example, a list of messages. Thus, the generated link data in this example includes elements of the application displayed on the display 204 of device 100 (e.g., message items) pertaining to the message application 502. These elements of the message application 502 are then combined, by the processor 240 of the device 100, with other display objects to generate a functionally and visually different display for the display device 290. In this example, the processor 240 of the device 100 generates display data for a display on the display 204 of the device 100 of a message composition application and the processor 240 of the device 100 generates link data for outputting to the display device 290. The link data comprises display data for display on the display 204 of the display device 290 that includes elements of the application when displayed on the device 100 and further includes other elements, for example, selectable display objects 506 for launching a search function to search message items and access other message folders, a list of message items 508, and an open message window 510. The open message window 510 further includes a number of selectable display objects 512, which when selected may execute a message composition window to reply to the message or forward the message or may cause the messaged to be deleted. It will be appreciated that the processor 240 of the device 100 generates the display data for both devices 100, 290, where at least one element in the display data for the device 100 is the same as at least one element in the display data for the second, display device 290.

In this exemplary embodiment, the display device 290 includes an input device 206 (e.g., touchscreen) to allow a user to input data and select displayed items. For example, a user may select a message item 514, which is highlighted in the figure on the display of the display device 290. The selection of the message item 514 causes the processor 240 of the device 100, executing the message application, to provide the expanded view of the message 510, as illustrated on the right hand side of the message application 504. While the user navigates the message application 504 on the display device 290, the processor 240 of the device 100 continues to generate and output display data to the display 204 of the device 100. This is illustrated in the figure by the highlighted message 516 which corresponds to the highlighted message 514 displayed on the display 204 of the display device 290.

To enable the display device 290 to control the applications executed on the device 100, the processor 240 of the display device generates control data that is communicated to the device 100 via the established communication link 434. In an alternative embodiment, the display device 290 does not include any suitable user input devices. In this alternative embodiment a user is able to use the input device 206 of the device 100 to control the application running on the device 100, but displayed on the display device 290. It will be appreciated that while the link data is generated and communicated to the display device 290 a similar, reduced, display is still generated by the processor 240 of the device 100 and displayed on the display 204 of the device 100.

In an alternative embodiment, the display device 290 may not include a user input 206, such that the user will continue to control the message application on the device 100 using the user input device 206 of the device 100. It will be appreciated that, since the display data output to the display device 290 is generated by the processor 240 of the device 100, the processor 240 of the device 100 is able to allow a user to utilise an input device 204 of the device 100 to make selections based on the display of the display device 290. For example, the processor 240 of the device may generate and provide a cursor that is movable by a user on the display 204 of the display device 290 to allow selections to be made.

In this exemplary embodiment, the link data corresponds to display data generated by the processor 240 of the device 100. It will be appreciated that the display data will be repeatedly generated by the processor 240 of the device 100, for example at a rate of 50 Hz, or integer values up to 600 Hz, depending on the capabilities of the display device 290. In the exemplary embodiment where the link data comprises data associated with an application, it may only be necessary to generate and communicate the data once.

Thus, a user is provided with a greater amount of functionality than that available on a smaller, handheld, device, since the processor 240 of the device 100 is configured to generate two sets of display data for a single application, executable on the device 100.

Figure 7:
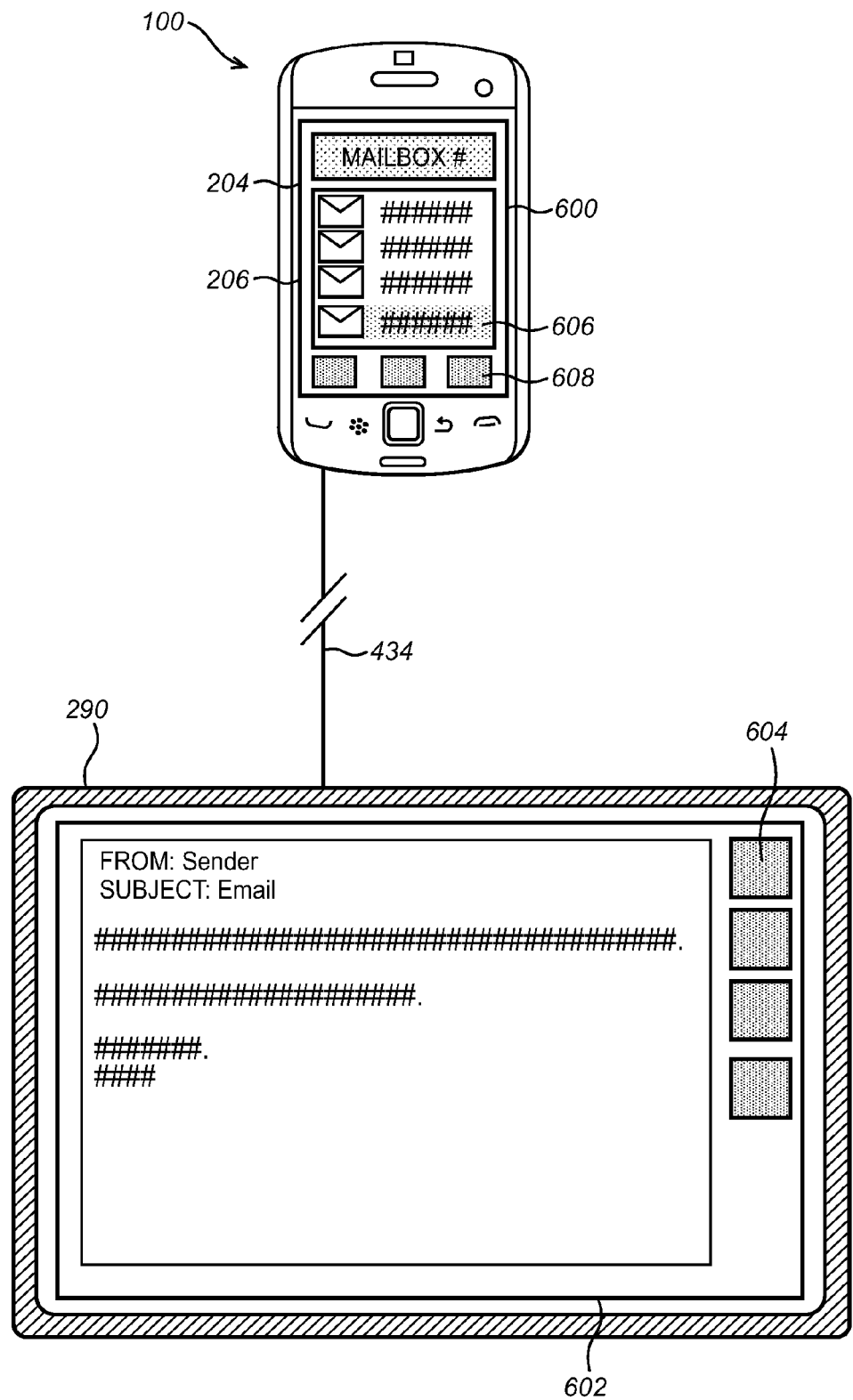
FIG. 7 illustrates a system comprising a device and a display device similar to the system illustrated in FIG. 6.

FIG. 7 illustrates a system comprising a device 100 and a display device 290 similar to the system illustrated in FIG. 6. In this exemplary embodiment, the display device 290 is similar in function to the display device 290 illustrated in FIG. 6 in that it is not capable of executing or launching an application.

In this example, a message application is currently active on the device 100 and the processor 240 of the device 100 has previously executed the message application from memory, for example, and generates display data pertaining to the message application for display on the display 204 of the device 100. The message application is illustrated in the figure as a list of messages 600. In this example, each message is illustrated by an envelope icon or display object as is typical for email messages, but it will be appreciated that the display object may differ depending on the type of message in the list of messages 600. Each message in the list 600 is also accompanied by data related to or associated with the message, for example, message subject, message sender and date/time information.

A user may connect or dock the device 100 with the display device 290 as is described above in association with FIG. 6, for example. The connection protocol is similar to that described above. Accordingly, once a communication connection 434 is established and the processor 240 of the device has determined the capability of the display device 290, the processor generates link data pertaining to the message application 600. It will be appreciated that it is not necessary to determine the capability of the display device 290 before the processor 240 of the device 100 generates and outputs the link data to the display device 290. For example, after a connection is established between the device 100 and the display device 290, the processor 240 of the device 100 may generate and output link data to the display device 290 comprising multiple sets of link data, including link data for launching an application, display data pertaining to a display different than that displayed on the device 100 and display data pertaining to a display that is the same as that displayed on the device 100. The processor 240 of the display device 290 is configured to determine which data the processor 240 is capable of executing and communicates the determination to the processor 240 of the device 100, so that the processor 240 of the device 100 is configured to generate and output data that the display device 290 is capable of executing.

The link data generated and output by the processor 240 of the device 100 in this example relates to a selected one of the messages 606 or elements in the list of messages 600 displayed on the display 204 of the device 100, which is highlighted in the figure. The link data in this example is display data relating to an element of a selected or highlighted message 606, such that the selected or highlighted message 606 is displayed on the second, display device 290. For example, the list view of messages 600 includes, for each item, the message sender and subject line. These elements are used to generate the display data for display on the display device 290. The link data, when it is received by the processor 240 of the display device 290 is used to generate the display of a message 602. The displayed message 602 includes the elements from the selected or highlighted message 606, and also includes one or more display objects 604, not displayed in the list of messages 606 displayed on the display 204 of the device 100, which when selected provide to a user actions related to the displayed message and may include reply, forward or delete.

Similarly, but not illustrated, a user may select one of the display objects 608 displayed on the display 204 of the device 100. The selectable display objects 608 may include selectable actions such as compose a message, or reply to a highlighted message item. When a user selects one of the display objects 608, for example "compose", the processor 240 of the device 100 generates link data pertaining to a message composition window, which is subsequently output to the processor 240 of the display device 290 for display. It will be appreciated that as a user enters data in the message composition window (e.g., recipient, subject, body of message) using input device 206 of the device 100, for example, the link data will be repeatedly generated and output by the processor 240 of the device to reflect the entered data.

Thus in an exemplary embodiment, a user is provided with a display on a second device pertaining to an element of an application executable on a first device.

Figure 8:
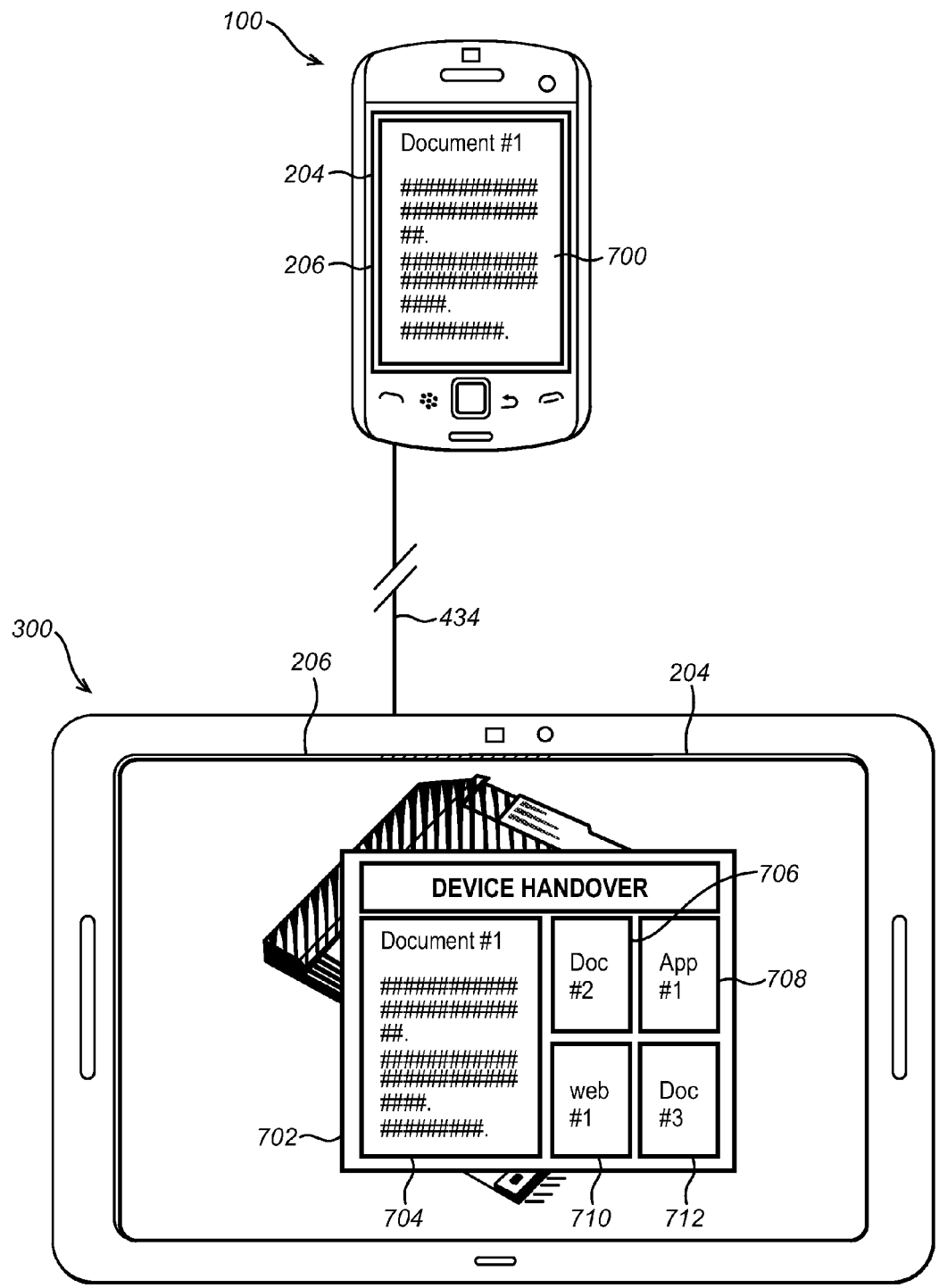
FIG. 8 illustrates a system comprising a device and a further device, similar to the devices illustrated in FIG. 5 for generating a handover display on the further device.

FIG. 8 illustrates a system comprising a device 100 and a further device 300. The devices 100, 300 illustrated in FIG. 8 are similar to those illustrated in FIG. 5.

The scenario depicted in FIG. 8 relates to a user docking or connected a handheld, mobile, device 100 with a second device 300 that allows a user to continue to work uninterrupted. In this exemplary embodiment, a user is editing a document 700 (Document #1) that is displayed on the device 100. The document 700 in this example is a document that is open on a word processing application executed by the processor 240 of the device 100. The word processing application is an application executable on the device 100 and may be stored in memory in the device 100, for example, in the flash memory 244. The document 700 may be a new document and may be stored on the device 100 or may be stored elsewhere. For example, one or more of the servers 410a, 410b, 410c and 410d, illustrated in FIG. 3, may provide a remote storage capability for storage of documents accessible by the device 300 and device 100.

The processor 240 of the device 100 may also monitor the applications and files that are viewed on the device or are attempted to be viewed on the device. For example, a user may attempt to open a document on the device 100, but if the document is not supported by the device the document will not open. Details or application data of these applications and documents may be stored within memory (e.g., flash memory 244) of the device 100. The application data may be referred to as link data and comprises data related to one or more elements (e.g., file name, application name, application type or file location) of the applications or files currently open or previously accessed. The stored details may include one or more of the type of application, user entered details, website URL or address, a document name, and a document location. For example, if a user views a website on the device 100, the URL of the viewed website is stored as text or characters, or if a user views a file the name and location of the document (e.g., pointer) is stored along with the name or type of associated application used to view the document.

The processor 240 of the device 100 may store the above-mentioned details for a given period of time. For example, the processor 240 may store the details of all the documents and applications viewed on a given day, e.g., today. Alternatively, the processor 240 may store the details of all applications and files accessed since a previous event. For example, an event may be the last or previous time that the two devices 100, 300 were connected together, or may be the last time that a user logged-in to the device 300.

Furthermore, the processor 240 may be configured to filter the application data or details of the applications and files that are viewed or are attempted to be viewed to only include the application data related to applications and files that could not be viewed or accessed or were viewed, but with a reduced or poor resolution or viewing experience. For example, if a high-definition video or image is viewed on a smaller device (e.g., device 100) it is likely that the viewing experience may not be good, since the size of the screen is not as well suited for high-definition content, as a larger screen. Also, if a user attempts to view video content while the content is being downloaded over a wireless network, for example, the content may be paused during buffering, providing a reduced performance of the content.

When the device 100 is brought into proximity with the device 300, the two devices will establish a communication connection 434, as described above. The term proximity is used to describe the two devices as being within communication range or predefined distance of each other. It will be appreciated that the devices may have been previously paired or previously configured to recognise one another and establish a communication connection 434 without further intervention from a user. As part of the communication establishment, the device 100 may communicate details of a user or user identification to the device 300. The establishment of the communication connection 434 may be referred to as an event, as described further below.

When the device 100 and the device 300 have established communication, the processor 240 of the device 100 generates application data relating to or associated with any currently open or active applications or documents and any stored application data from previously accessed or application accesses previously attempted or documents. In this exemplary embodiment, the application data generated by the processor 240 of the device 100 contains data relating to the document 700 open on the device 100, two other recently accessed documents, an application and a website. For example, the two recently accessed documents are documents that could not be opened on the device 100 due to incompatibility issues and the application was executed and the website was viewed in the time period since the device 100 was connected with the device 300. The processor 240 outputs the generated application data to the tablet 300 via the connection 434.

A user may access the device 300, using a log-in, for example, as is known in the art. If a log-in is used, the identity of the user may be used to verify that any received application data, received from the device 100, should be provided to the user. The log-in may also be considered to be an event that triggers the processor 240 of the device 100 to generate and output the application data. For example, the two devices 100, 300 may establish a connection, but no application data is provided to the device 300. Rather, once a user successfully accesses the device (e.g., via a successful log-in) the device 300 communicates the successful access to the device 100, such that the log-in event causes the device 100 to generate and output the application data to the device 300.

In some exemplary embodiments, the application data is generated by the processor of the device 100 and is output to the processor of the device 300 when communication is established. However, the processor 240 of the device 300 may not act upon the received data until an event is detected, such as, for example, a user interaction with the device 300, e.g., a user log-in.

The processor 240 of the device 300 receives the application data pertaining to a display of application data associated with applications executable on the device 300. For example, the device receives application data related to applications on the device 100 to allow the device to generate a display of applications (and file) that are executable on the device 300.

The processor 240 of the device 300 generates a display 702 for handover of applications and files for display on the display 204 of the device 300, based on the received application data from the device 100. The display 702 includes a number of selectable display objects 704, 706, 708, 710, 712, which when selected by a user, for example using the input device 206 of the device 300, cause the processor 240 of the device 300 to launch, or execute an appropriate application or open a file. It will be appreciated that to open a file, it may also be necessary to launch an appropriate application. In this exemplary embodiment, the display 702 includes a display object 704 for the currently open file 700 of the device 100, display objects 706, 712 for two previously opened documents that were accessed since the two devices 100, 300 were connected, display object 708 for an application which is not supported by the device 100, but the user attempted to open and is available on the device 300 and the display object 710 for a website containing content that could not be effectively viewed on the display 204 of the device 100. It will be appreciated that the processor of 240 of the device may only display objects for those files or applications that can be executed or opened on the device 300.

In response to a user selection of one of the display objects, the processor 240 of the device 300 opens or launches the appropriate application related to the display object. For example, if a user selects the display object 710 related to the website, the processor launches, from memory, an application that is capable of accessing websites and enters an address or URL for the recently viewed website using the application data received from the processor 240 of the device 100. Furthermore, if a user selects the display object 704 related to the open document, the processor 240 of the device 300 opens an application, from memory, capable of viewing an editing the document and opens the document within the launched application. The document may be retrieved directly from memory of the device 100 using the details of the document (e.g., document name and location) or may obtain the document from a remote server using a pointer to the document, both pointer and document details being contained in the application data received from the device 100.

After a selection is made based on the handover display, the display object related to the selected object may disappear from the handover display. The handover display may continue to be displayed until the connection between the two devices is lost or terminated and may be closed by a user. When the two devices are connected, the device 100 may display a screen stating that handover to the laptop is being performed. Furthermore, in the example where a document currently open on the device 100 is selected to be opened on the device 300, the device 100 may first save and close the document in response to data received from the device 300.

Figure 9:
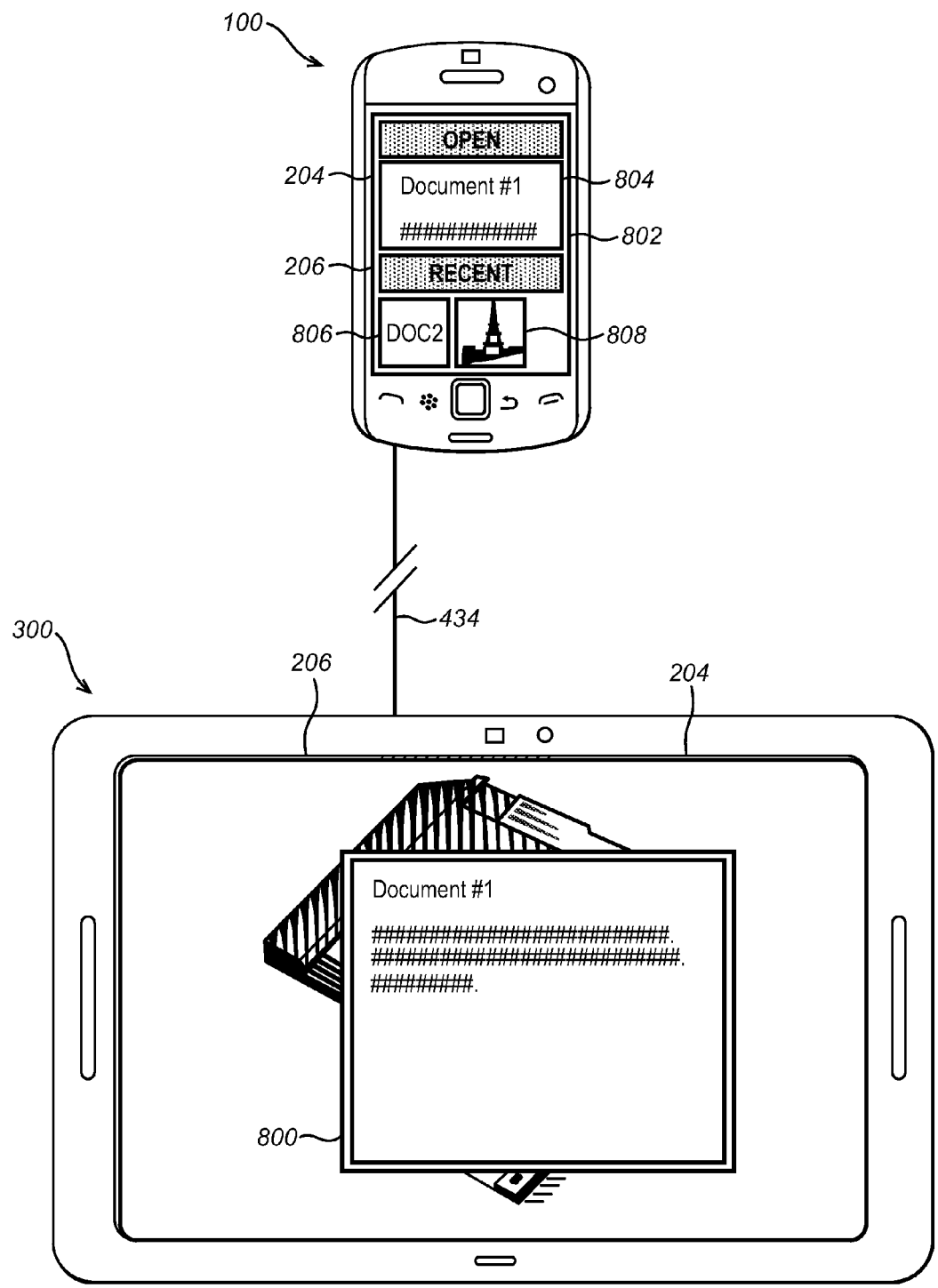
FIG. 9 illustrates a system comprising a device and a further device, similar to the devices illustrated in FIG. 5 for generating a handover display on the device.

FIG. 9 illustrates a similar embodiment as described in association with FIG. 8 in a reverse direction when a user moves from the device 300 to the device 100.

In the exemplary embodiment illustrated in FIG. 9, the event that triggers the application data to be generated and output may be different and includes a user log-out of the device 300 or when the device 100 reaches a predetermined distance from the device 300, which may be detected using the communication protocol. For example, if the device 100 is moved away from the tablet to the extent that it is determined that the devices will soon lose the established communication connection, the processor 240 of the device will generate application data and output the application data to the device 100. Detecting the distance between two devices that are in communication via a short-range communication protocol is known in the art and may use, for example, signal strength.

Similar to the example illustrated in FIG. 8, the application data relates to currently open files and applications on the device 300 and previously opened or accessed applications and files. For example, all applications and files accessed on the device 300 since the two devices established the current communication connection may be stored in a memory of the device 300 (e.g., flash memory 244) and used to generate the application data which is output to the device 100 when it is detected that the device has moved away from the device 300 to a position that is a predetermined distance away. The predetermined distance may be an integer distance in meters ranging from 1 to 30 meters.

In a manner similar to that described in association with FIG. 8, the processor 240 of the device 100 generates display data for display on the display 204 of the device 100 containing selectable display objects related to files and applications associated with application data received from the device 300.

For example, in FIG. 9, a file 800 is open and displayed on the display 204 of the device 300 that contains characters or text. Therefore, when a display 802 is generated by the processor 240 of the device 100, the display 802 includes a display object 804 corresponding to the file 800. As above, the file may be stored locally in memory of the device 100 or remotely. The display 802 further includes selectable display objects 806, 808 for a recently opened document (selectable display object 806) and a recently viewed image (selectable display object 808).

The display 802 may also include appropriate labels or headings to indicate which display objects relate to currently open files or applications (e.g., "open") and recently opened or accessed applications or files (e.g., "recent").

In this exemplary embodiment, the document open on the device 300 may be the same document that was previously open on the device 100 and may still be open on the device 100. Therefore, when handing back to the device 100 and a user selects to open the same document on the device 100, which is currently open on both device 100, 300, the user may be promoted or asked to close the instance of the document currently open on the device 100. Alternatively, the processor 240 of the device 100 may close the current instance of the open document open on device 100 without saving changes, so as not to lose any changes made while the file was open on the device 300.

In an exemplary embodiment, when handing over between devices the processor 204 of the respective devices 100, 300 may save all current open files to avoid data being lost.

In an exemplary embodiment, when the processor 240 of the device 100 generates the display 802 based on the received application data, the processor 240 of the device 100 only displays selectable display objects related to those applications and files that can be opened or launched on the device 100. That is to say that the processor determines the capabilities of the device 100 and selects those applications and files that can be opened or launched on the device 100. The determination may be based on the capabilities of the processor 240 or the display 204 of the device 100 or may be based on the applications currently stored in memory on the device 100.

In some exemplary embodiments the event that triggers the handover between the two device includes one device being picked up or put down which may be determined by one or more sensors (e.g., orientation sensor 251), a user interacting with one device based on an active input using input device 206, for example, or if one of the two device is devices is idle for a predetermined time.

Accordingly, a user is able to more easily continue working when going from one device to another.

FIG. 10 is a flow chart depicting a method 900 performed by the processors 240 of a first device 100 and second device 300 for generating display data and link data, as described in association with FIGS. 5 to 7. It will be appreciated that some of the steps may be optionally performed and the method will be split between two devices, such that the first device 100 may perform the steps illustrated in blocks 902, 904, 906 and 908 and the second device 300 may perform the steps illustrated in blocks 910, 912 and 914.

At block 902, the processor generates display data for an active application that is currently executed on the first device 100.

At block 904, the processor outputs the generated display data to a display, e.g., display 204, of the first device 100. For example, the application is a message composer, so that a message composition window is displayed. The message composition window may include various types of data, or elements that allow the display to be generated, for example, the type of application, version data of the application, and any user entered data/information (or populated fields) such as a message address/recipient (e.g., email address), message subject or message body. Further data on the application relating to elements of the application will also be included in the display data related to the visual appearance of the application, including any selectable display objects.

At block 906, the processor generates link data for, or pertaining to, the presently active application. The link data includes data on various ones of the elements described above. For example, the link data includes, in one example, the application type and any user-entered data. However, some of the elements of the application which are present in the display data may be disregarded by the processor or omitted from the link data. For example, the link data, in one example, does not include any data related to the appearance of the display. In an alternative embodiment, the processor may include all the elements relating to the display of the application in the link data, but remove or discard one or more elements before the link data is output.

In block 908, the link data is output or communicated to the processor 240 of the second device 300. In block 910, the link data is received by second device 300.

In block 912, the processor 240 of the second device 300 generates display data based on the link data. For example, the processor of the second device executes or launches an application based on the application type data in the link data and enters or populates appropriate fields in the application based on the user entered data, and generates display data pertaining to the executed application including the populated fields.

In block 914, the display data is output by a display 204 of the second device 300.

FIG. 11 is a flow chart depicting a method 1000 performed by the processors 240 of a first device 100 and second device 300 for generating display data as described in association with FIGS. 8 and 9. It will be appreciated that some of the steps may be optionally performed and the method will be split between two devices, such that the first device 100 may perform the steps illustrated in blocks 1002, 1004, and 1006 and the second device 300 may perform the steps illustrated in blocks 1008, 1010 and 1012.

At block 1002, the processor 240 of the second device 300, detects an event. For example, the first device 100 is a portable, handheld, device and the second device 300 is a laptop or portable computer and the detected event is the first device 100 moving away from the second device 300 to a predetermined distance.

At block 1004, the processor of the second device 300 generates application data, or first application data associated with one or more applications executable on the second device 300. The executable applications may include applications that are currently running or active on the device 300, or previously launched or activated applications. Data on the previously launched applications may be stored within a memory of the device 300.

At block 1006, the first application data, generated by the processor 240 of the second device 300, is output to the first device 100.

At block 1008, the first application data, generated by the processor 240 of the second device 300, is received by the first device 100.

At block 1010, the processor 240 of the first device 100 generates second application data for display. The second application data relates to or pertains to the first application data. For example, the second application data includes one or more selected display objects, which when selected launch or execute an application, similar to the application being executed or previously executed on the second device 300. The selectable display objects may also relate to files or documents that are stored in the second device 300, the first device 100, or may be stored remotely and accessed using a pointer. For documents and files, the first application data received from the second device 300 may include document name, document location or pointer and data on an associated application used to view the file.

At block 1012, the second application data is output to a display of the first device 100 for display to allow a user selection.

While the present application is primarily described in terms of devices and methods (e.g., first and second devices 100, 300), the devices may include components for performing at least some of the example aspects and features of the described methods, be it by way of hardware components (such as the memory 244, 246, 248 and/or the processor 240), software or any combination of the two, or in any other manner. Moreover, an article of manufacture for use with the apparatus, such as a pre-recorded storage device or other similar computer readable medium including program instructions recorded thereon may direct the apparatus to facilitate the practice of the described methods. It should be understood that such apparatus and articles of manufacture come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

It will be appreciated that the foregoing discussion relates to particular embodiments. However, in other embodiments, various aspects and examples may be combined.

The invention claimed is:
1. A device comprising:
a display configured to display first application data;
a processor configured to communicate with a further device, the processor being further configured to:
detect an event associated with the further device;
transmit a set of data identifying processing capabilities of the device to the further device based on detection of the event;
receive second application data from the further device based on transmission of the set of data, the second application data generated by the further device based on the processing capabilities of the device, and the second application data associated with at least one or more applications currently executing on the further device and at least one of a file and an application previously accessed on the further device;
generate the first application data based on the second application data;
output the first application data to the display;
receive, in response to output of the first application data, at least one user input associated with the first application data; and
send, in response to receipt of the at least one user input, control data to the further device, the control data configured to control the at least one or more applications currently executing on the further device.

2. The device of claim 1, wherein the received second application data comprises data associated with one or more applications that are incompatible with the further device.

3. The device of claim 1, wherein the received second application data comprises data associated with one or more applications that are dependent on a capability of the further device.

4. The device of claim 1, comprising an input device configured to generate input data based on user selected first application data from the first application data outputted to the display.

5. The device of claim 4, wherein the processor is configured to execute an application in conjunction with the second application data based on the user selected first application data.

6. The device of claim 1, wherein the processor is configured to determine a capability of the device and output the first application data for display based on the determined device capability.

7. The device of claim 1, wherein the second application data comprises one or more of: application type data, file data, a pointer to remotely stored file data, user entered characters or a message item.

8. The device of claim 1, wherein the first application data comprises a list of one or more items associated with the second application data.

9. The device of claim 1, wherein the detected event is one or more of: an establishment of communication between the processor and the further device, a user interaction with the device, a distance between the device and the further device being greater than a predefined distance, a distance between the device and the further device being less than a predefined distance, detected movement of the device, and the device being left idle for a predetermined time.

10. The device of claim 1, wherein the second application data comprises data associated with one or more applications that previously failed to execute on the further device or previously executed on the further device with reduced performance.

11. The device of claim 1, wherein the second application data comprises data associated with one or more applications active on the further device within a predetermined time period.

12. The device of claim 11, wherein the time period is determined based on an elapsed time since a previous event.

13. A device comprising:
a processor configured to communicate with a further device, the processor being further configured to:
    detect an event associated with the further device;
    identify, based on detection of the event, a set of processing capabilities of the further device;
    generate, in response to identification of the set of processing capabilities of the further device, application data associated with at least one or more applications currently executing on the device and at least one of a file and an application previously accessed on the device, the application data generated based on the set of processing capabilities of the further device;
    output the application data to the further device;
    receive, in response to output of the application data to the further device, control data from the further device, the control data configured to control the at least one or more applications currently executing on the device; and
    control execution of the at least one or more applications based on the control data.

14. A system comprising:
a first device; and
a second device, the second device being in communication with the first device;
the first device comprising:
    a display configured to display first application data;
    a first processor configured to communicate with the second device, the first processor being further configured to:
        detect an event associated with the second device;
        transmit a set of data identifying processing capabilities of the first device to the second device based on detection of the event;
        receive, based on based on transmission of the set of data, second application data from the second device, the second application data being generated by the second device based on the processing capabilities of the first device, and the second application data associated with at least one or more applications currently executing on the second device and at least one of a file and an application previously accessed on the second device;
        generate the first application data based on the second application data;
        output the first application data to the display;
        in response to output of the first application data, receive at least one user input associated with the first application data; and
        in response to receipt of the at least one user input, send control data to the second device, the control data being configured to control the at least one or more applications currently executing on the second device;
the second device comprising:
    a second processor configured to communicate with the first device, the second processor being further configured to:
        identify a set of processing capabilities of the first device based on the set of data transmitted by the first device;
        detect an event associated with the second device;
        generate the second application data, in response to the detected event, based on the set of processing capabilities of the first device;
        output the second application data to the first device;
        in response to output of the second application data to the first device, receive control data from the first device, the control data being configured to control the at least one or more applications currently executing on the second u device; and
        control execution of the at least one or more applications based on the control data.

15. A method for a device, the method comprising:
  establishing, by the device, communication with a further device;
  detecting an event associated with the further device;
  transmitting a set of data identifying processing capabilities of the device to the further device based on detecting the event;
  receiving, based on first application data from the further device based on transmitting the set of data, the first application data generated by the further device based on the processing capabilities of the device, and the first application data associated with at least one or more applications currently executing on the further device and at least one of a file and an application previously accessed on the further device;
  generating second application data based on the first application data;
  outputting the second application data to a display of the device;
  in response to outputting the first application data, receiving at least one user input associated with the second application data; and
  in response to receiving the at least one user input, sending control data to the further device, the control data configured to control the at least one or more applications currently executing on the further device.

16. The method of claim 15, wherein the received first application data comprises data associated with one or more applications that are incompatible with the further device.

17. The method of claim 15, wherein the received first application data comprises data associated with one or more applications that are dependent on a capability of the further device.

18. The method of claim 15, comprising generating input data based on user selected second application data from the second application data outputted to the display.

19. The method of claim 18, comprising executing an application in conjunction with the first application data based on the user selected second application data.

20. The method of claim 15, comprising determining a capability of the device and outputting the second application data for display based on the determined device capability.

21. The method of claim 15, wherein the first application data comprises one or more of application type data, file data, a pointer to remotely stored file data, user entered characters or a message item.

22. The method of claim 15, wherein the second application data comprises a list of one or more items associated with the first application data.

23. The method of claim 15, wherein the detected event is one or more of: an establishment of communication between the device and the further device, a user interaction with the device, a distance between the device and the further device being greater than a predefined distance, a distance between the device and the further device being less than a predefined distance, detected movement of the device, and the device being left idle for a predetermined time.

24. The method of claim 15, wherein the first application data comprises data associated with one or more applications that previously failed to execute on the further device or previously executed on the further device with reduced performance.

25. The method of claim 15, wherein the first application data comprises data associated with one or more applications active on the further device within a predetermined time period.

26. The method of claim 25, wherein the time period is determined based on an elapsed time since a previous event.

27. A method for a device, the method comprising:
  establishing, by the device, communication with a further device;
  detecting an event associated with the device;
  identifying, based on detecting the event, a set of processing capabilities of the further device;
  generating, in response to identifying the set of processing capabilities of the further device, application data associated with at least one or more applications currently executing on the device and at least one of a file and an application previously accessed on the device, the application data generated based on the set of processing capabilities of the further device;
  outputting the application data to the further device;
  in response to outputting the application data to the further device, receiving control data from the further device, the control data configured to control the at least one or more applications currently executing on the device; and
  controlling execution of the at least one or more applications based on the control data.

28. A method for a system comprising a first device and a second device, wherein the second device is in communication with the first device, the method comprising:
  the first device
    receiving a set of data from the second device, the set of data identifying processing capabilities of the second device;
    identifying a set of processing capabilities of the second device based on the set of data;
    detecting an event associated with at least one of the first device and the second device;
    generating first application data associated with at least one or more applications currently executing on the first device and at least one of a file and an application previously accessed on the first device, the first application data generated based on the set of processing capabilities of the second device; and
    outputting the first application data to the second device;
  the second device
    receiving the first application data;
    generating second application data based on the first application data;
    outputting the second application data to a display of the second device;
    in response to outputting the second application data, receiving at least one user input associated with the second application data; and
    in response to receiving the at least one user input, sending control data to the first device, the control data being configured to control the at least one or more applications currently executing on the first device.

29. A non-transitory computer-readable medium comprising executable instructions which, when executed, cause a processor of a device to perform a method comprising:
  establishing communication with a further device;
  detecting an event associated with the further device;
  transmitting a set of data identifying processing capabilities of the device to the further device based on detecting the event;
  receiving first application data from the further device based on transmitting the set of data, the first application data generated by the further device based on the processing capabilities of the device, and the first application data associated with at least one or more applications currently executing on the further device and at least one of a file and an application previously accessed on the further device;

generating second application data based on the first application data;

outputting the second application data to a display of the device;

in response to outputting the first application data, receiving at least one user input associated with the second application data; and in response to receiving the at least one user input, sending control data to the further device, the control data configured to control the at least one or more applications currently executing on the further device.

* * * * *

UNITED STATES PATENT AND TRADEMARK OFFICE
CERTIFICATE OF CORRECTION

PATENT NO. : 9,516,072 B2  
APPLICATION NO. : 13/774586  
DATED : December 6, 2016  
INVENTOR(S) : Dan Zacharias Gardenfors et al.

It is certified that error appears in the above-identified patent and that said Letters Patent is hereby corrected as shown below:

On the Title Page

Item (72) Inventors, delete "Svante Magnus Ulfstand Hallerström" and insert -- Svante Magnus Ulfstand Hallerström Sjöstedt --

Signed and Sealed this  
Twenty-fifth Day of April, 2017

Michelle K. Lee  
*Director of the United States Patent and Trademark Office*